US012668451B2

(12) United States Patent
Shirasaka

(10) Patent No.: US 12,668,451 B2
(45) Date of Patent: Jun. 30, 2026

(54) IMAGE FORMING APPARATUS, SHEET DISCHARGE METHOD, AND NON-TRANSITORY COMPUTER-READABLE RECORDING MEDIUM STORING PROGRAM

(71) Applicant: Konica Minolta, Inc., Tokyo (JP)

(72) Inventor: Satoru Shirasaka, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 18 days.

(21) Appl. No.: 18/911,472

(22) Filed: Oct. 10, 2024

(65) Prior Publication Data

US 2025/0122045 A1 Apr. 17, 2025

(30) Foreign Application Priority Data

Oct. 12, 2023 (JP) ................................ 2023-176754

(51) Int. Cl.

*B65H 43/04* (2006.01)
*B65H 29/62* (2006.01)
*G03G 15/00* (2006.01)

(52) U.S. Cl.

CPC ............ *B65H 43/04* (2013.01); *B65H 29/62* (2013.01); *G03G 15/5029* (2013.01); *G03G 15/5062* (2013.01); *G03G 15/6573* (2013.01); *G03G 2215/00945* (2013.01)

(58) Field of Classification Search

CPC .... B65H 43/04; B65H 29/62; G03G 15/5029; G03G 15/5062; G03G 15/6573; G03G 2215/00945

See application file for complete search history.

(56) References Cited

U.S. PATENT DOCUMENTS 7,874,551 B2 * 1/2011 Iguchi ................ B65H 31/3081 270/58.11
2003/0190169 A1 * 10/2003 Shibaki .................. B65H 43/04 399/21
2010/0187744 A1 * 7/2010 Hirabayashi ........... B41J 13/106 270/52.09
2017/0305701 A1 * 10/2017 Kotani ................... B65H 31/18
2018/0001673 A1 * 1/2018 Takeshita ............... G06K 13/07
2018/0059610 A1 * 3/2018 Takuwa ................. B65H 29/58

(Continued)

FOREIGN PATENT DOCUMENTS

JP 2003146517 A 5/2003
JP 2013104823 A 5/2013

*Primary Examiner* — David H Banh

(74) *Attorney, Agent, or Firm* — RANKIN, HILL & CLARK LLP

(57) ABSTRACT

Provided is an image forming apparatus including: an image former that forms an image on a recording material; a conveyor that conveys the recording material; an output image reader that reads an output image formed on the recording material; a sheet discharge tray that accommodates the recording material discharged from the conveyor; and a controller that controls an operation of the conveyor based on a reading result of the output image reader. The controller causes a sheet discharge position of a first recording material, on which the output image as a normal image is formed, on the sheet discharge tray to differ from a sheet discharge position of a second recording material, on which the output image as an abnormal image is formed, on the sheet discharge tray in a conveyance direction.

13 Claims, 8 Drawing Sheets

(56) References Cited

U.S. PATENT DOCUMENTS

| | | | | |
|---|---|---|---|---|
| 2018/0246459 | A1* | 8/2018 | Yamamoto | G03G 15/5029 |
| 2020/0153999 | A1* | 5/2020 | Itou | G03G 15/5041 |
| 2020/0171550 | A1* | 6/2020 | Sakatani | G03G 15/6538 |
| 2020/0210115 | A1* | 7/2020 | Igawa | G03G 15/5012 |
| 2023/0096877 | A1* | 3/2023 | Oda | G03G 15/5062 358/1.14 |

* cited by examiner

IMAGE FORMING APPARATUS, SHEET DISCHARGE METHOD, AND NON-TRANSITORY COMPUTER-READABLE RECORDING MEDIUM STORING PROGRAM

CROSS REFERENCE TO RELATED APPLICATIONS

The entire disclosure of Japanese Patent Application No. 2023-176754, filed on Oct. 12, 2023, is incorporated herein by reference in its entirety.

BACKGROUND

Technological Field

The present invention relates to an image forming apparatus, a sheet discharge method, and a non-transitory computer-readable recording medium storing a program.

Description of Related Art

In the related art, there is known an image forming apparatus having an inspection function for inspecting the image quality of printed matter (see, for example, Patent Literatures (hereinafter, "Patent Literature" will be referred to as "PTL") 1 and 2). In such an image forming apparatus, it is necessary to distinguish between a recording material on which a normal image is formed (hereinafter referred to as a "first recording material") and a recording material on which an abnormal image is formed (hereinafter referred to as a "second recording material") and to cause the first recording material and the second recording material not to be mixed.

For example, in PTL 1 (Japanese Patent Publication Laid-Open No. 2003-146517), the first recording material and the second recording material can be distinguished from each other by causing, when recording materials is discharged, a sheet discharge position of the first recording material to differ from a sheet discharge position of the second recording material in the width directions of the recording materials (the directions orthogonal to the conveyance direction). Further, in PTL 2 (Japanese Patent Publication Laid-Open No. 2013-104823), the first recording material and the second recording material can be distinguished from each other by switching between a sheet discharge path for the first recording material and a sheet discharge path for the second recording material.

In the method disclosed in PTL 1, however, the sheet discharge mechanism becomes complicated since the sheet discharge position of a recording material is shifted in the width direction of the recording material. Further, in the method disclosed in PTL 2, a recording material is discharged by switching between the sheet discharge paths according to an inspection result, and thus, it is necessary to secure the time required for switching between the sheet discharge paths by causing the conveyance speed for a recording material to be slower than the normal conveyance speed, which may lead to a decrease in productivity.

SUMMARY

It is an object of the present invention to provide an image forming apparatus, a sheet discharge method, and a non-transitory computer-readable recording medium storing a program, each of which is capable of appropriately distinguishing between recording materials and discharging the recording materials based on the suitability of the image quality without complicating a sheet discharge mechanism and incurring a decrease in productivity.

In order to achieve at least one of the above-described objects, an image forming apparatus reflecting one aspect of the present invention includes:

- an image former that forms an image on a recording material;
- a conveyor that conveys the recording material;
- an output image reader that reads an output image formed on the recording material;
- a sheet discharge tray that accommodates the recording material discharged from the conveyor; and
- a controller that controls an operation of the conveyor based on a reading result of the output image reader, and
- the controller causes a sheet discharge position of a first recording material, on which the output image as a normal image is formed, on the sheet discharge tray to differ from a sheet discharge position of a second recording material, on which the output image as an abnormal image is formed, on the sheet discharge tray in a conveyance direction.

A sheet discharge method reflecting one aspect of the present invention is a sheet discharge method of discharging a recording material on which an image is formed, and includes:

- reading an output image formed on the recording material;
- determining, when the recording material is discharged, whether the output image is a normal image, based on a reading result of the output image; and
- causing a sheet discharge position of a first recording material, on which the output image as a normal image is formed, on the sheet discharge tray to differ from a sheet discharge position of a second recording material, on which the output image as an abnormal image is formed, on the sheet discharge tray in a conveyance direction.

A non-transitory computer-readable recording medium storing a program reflecting an aspect of the present invention stores a program that causes a computer to execute predetermined processing, and the predetermined processing includes:

- reading an output image formed on a recording material;
- determining, when the recording material is discharged, whether the output image is a normal image, based on a reading result of the output image; and
- causing a sheet discharge position of a first recording material, on which the output image as a normal image is formed, on the sheet discharge tray to differ from a sheet discharge position of a second recording material, on which the output image as an abnormal image is formed, on the sheet discharge tray in a conveyance direction.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Hereinafter, an embodiment of the present invention will be described in detail with reference to the accompanying drawings.

Figure 1:
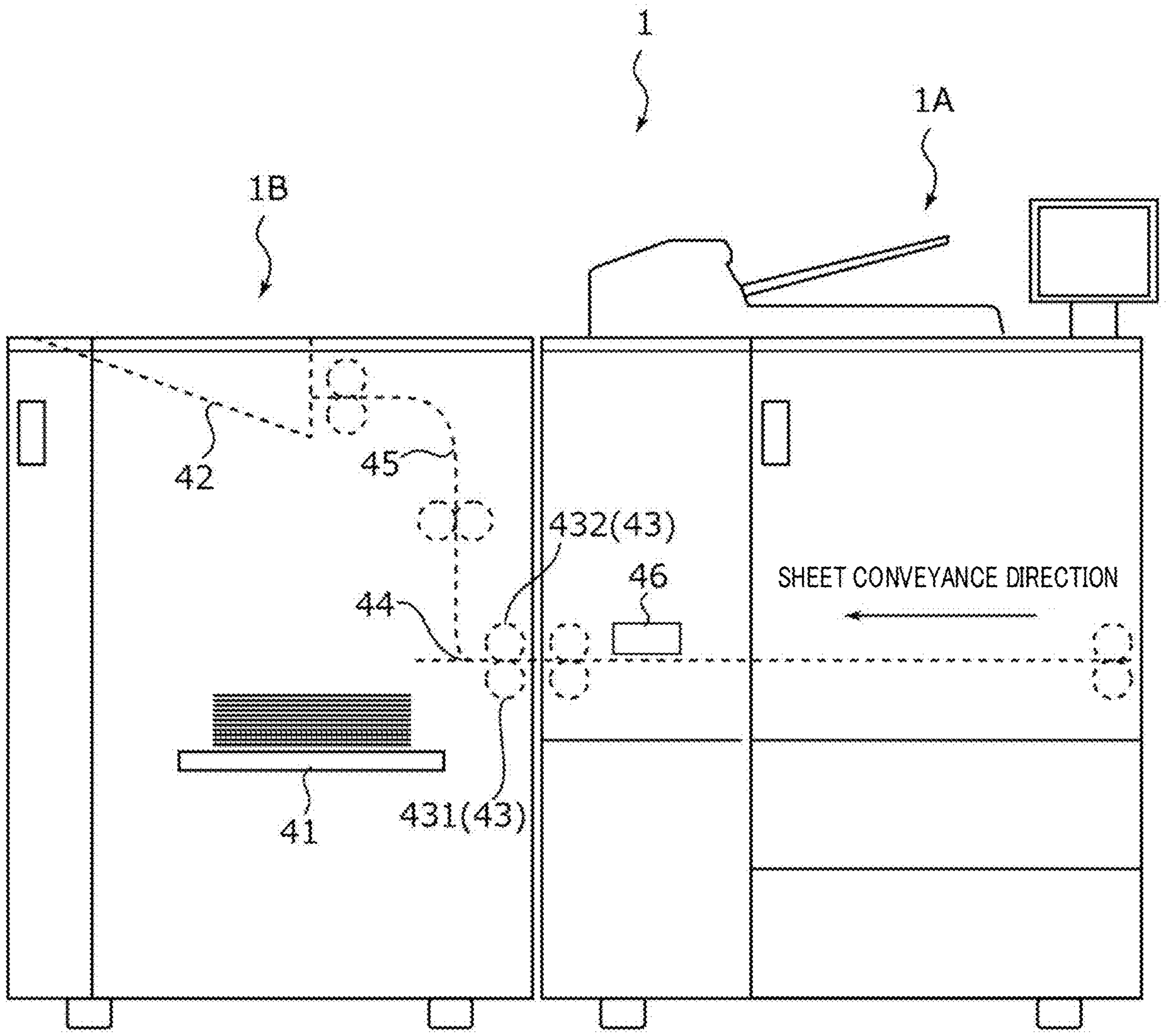
FIG. 1 is a diagram illustrating a system configuration of an image forming apparatus according to an embodiment.

FIG. 1 is a diagram illustrating a system configuration of an image forming apparatus 1 according to an embodiment.

As illustrated in FIG. 1, image forming apparatus 1 includes image forming apparatus main body 1A and sheet discharge unit 1B.

In image forming apparatus 1, control section 30 (see FIG. 3) of image forming apparatus main body 1A functions as a printer controller. Control section 30 controls, for example, based on print data transmitted from client terminal (illustration is omitted), sheet discharge unit 1B together with each block of image forming apparatus main body 1A.

Image forming apparatus main body 1A is connected to the client terminal (illustration is omitted) via a communication network such as a local area network (LAN) and a wide area network (WAN), for example. Image forming apparatus main body 1A performs printing on a recording material, for example, based on the print data from the client terminal.

Sheet discharge unit 1B includes sheet discharge tray 41, sub-sheet discharge tray 42, sheet discharge conveyance section 43, and the like. Sheet discharge path switching section 44 is disposed on the downstream side of sheet discharge conveyance section 43 in the conveyance direction. The conveyance section of sheet discharge unit 1B includes sheet discharge conveyance section 43 and sheet discharge path switching section 44.

Sheet discharge tray 41 and sub-sheet discharge tray 42 are disposed on the downstream side of sheet discharge conveyance section 43 in the conveyance direction, more specifically, on the downstream side of sheet discharge path switching section 44 in the conveyance direction. Sheet discharge tray 41 and sub-sheet discharge tray 42 load and accommodate a recording material sent from image forming apparatus main body 1A. A recording material conveyed by sheet discharge conveyance section 43 is discharged as it is, by falling by its own weight, to sheet discharge tray 41, and is loaded thereon. A recording material conveyed by sheet discharge conveyance section 43 is discharged to sub-sheet discharge tray 42 by passing through branch path 45.

Sheet discharge conveyance section 43 includes a pair of driving roller 431 and driven roller 432. Driving control of driving roller 431 is performed by control section 30 of image forming apparatus main body 1A. Specifically, control section 30 controls an output to a driving motor (illustration is omitted) connected to driving roller 431 to rotate driving roller 431 at a rotation speed set in advance.

Driving roller 431 and driven roller 432 are held in a state of being in pressure contact with each other with a predetermined pressure-contact load (for example, 20 N) to form a conveyance nip. Driving roller 431 rotates at the set rotation speed, whereby a recording material passed through the conveyance nip is sent out at a sheet discharge speed corresponding to the set rotation speed.

Sheet discharge path switching section 44 switches the destination of ejection of the recording material sent from sheet discharge conveyance section 43 to sheet discharge tray 41 or sub-sheet discharge tray 42. The operation of sheet discharge path switching section 44 is performed by, for example, control section 30 of image forming apparatus main body 1A. In image forming apparatus 1, a recording material is usually discharged to sheet discharge tray 41. Details of recording material discharge processing in image forming apparatus 1 will be described later.

Figure 2:
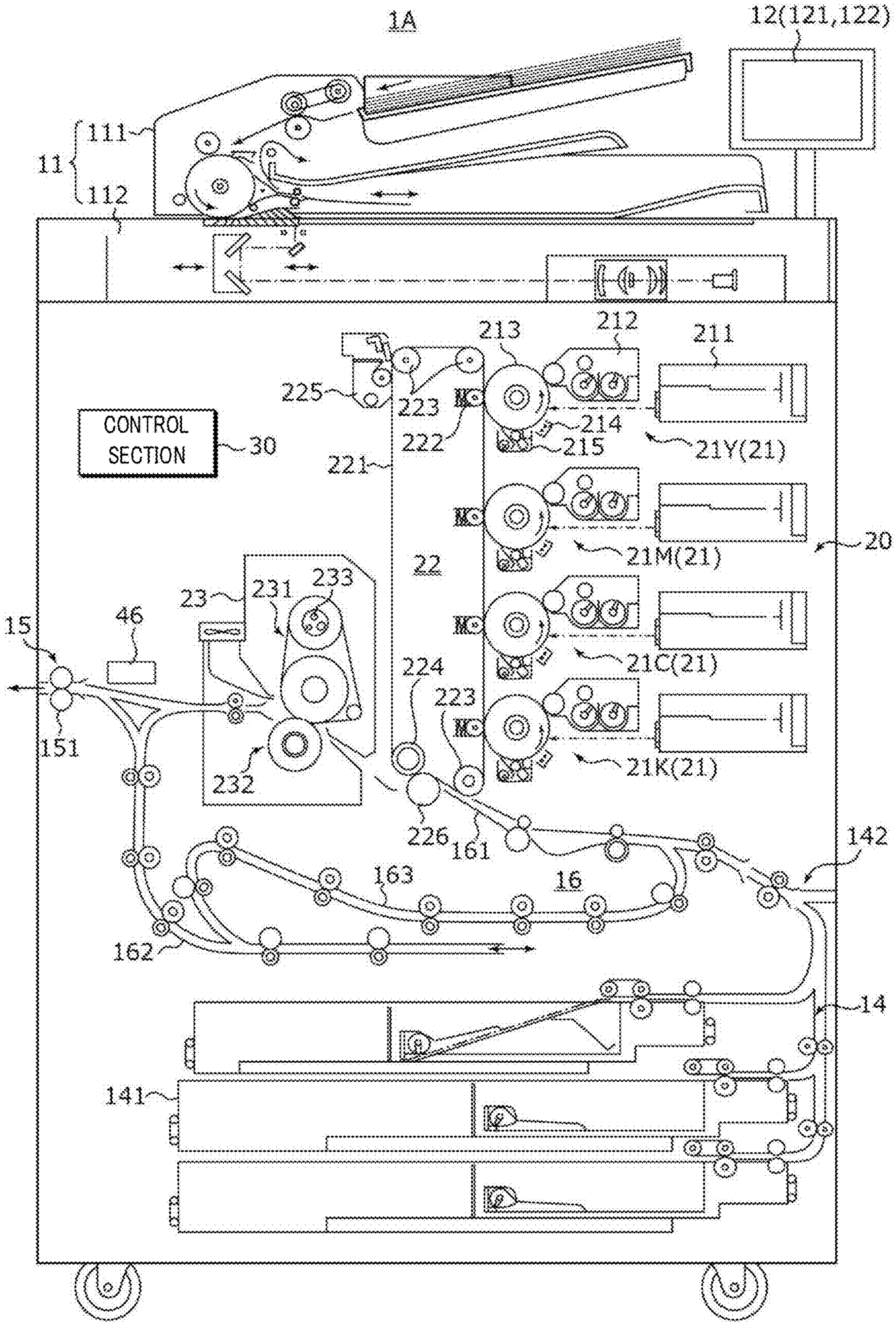
FIG. 2 is a diagram schematically illustrating an overall configuration of an image forming apparatus main body.
Figure 3:
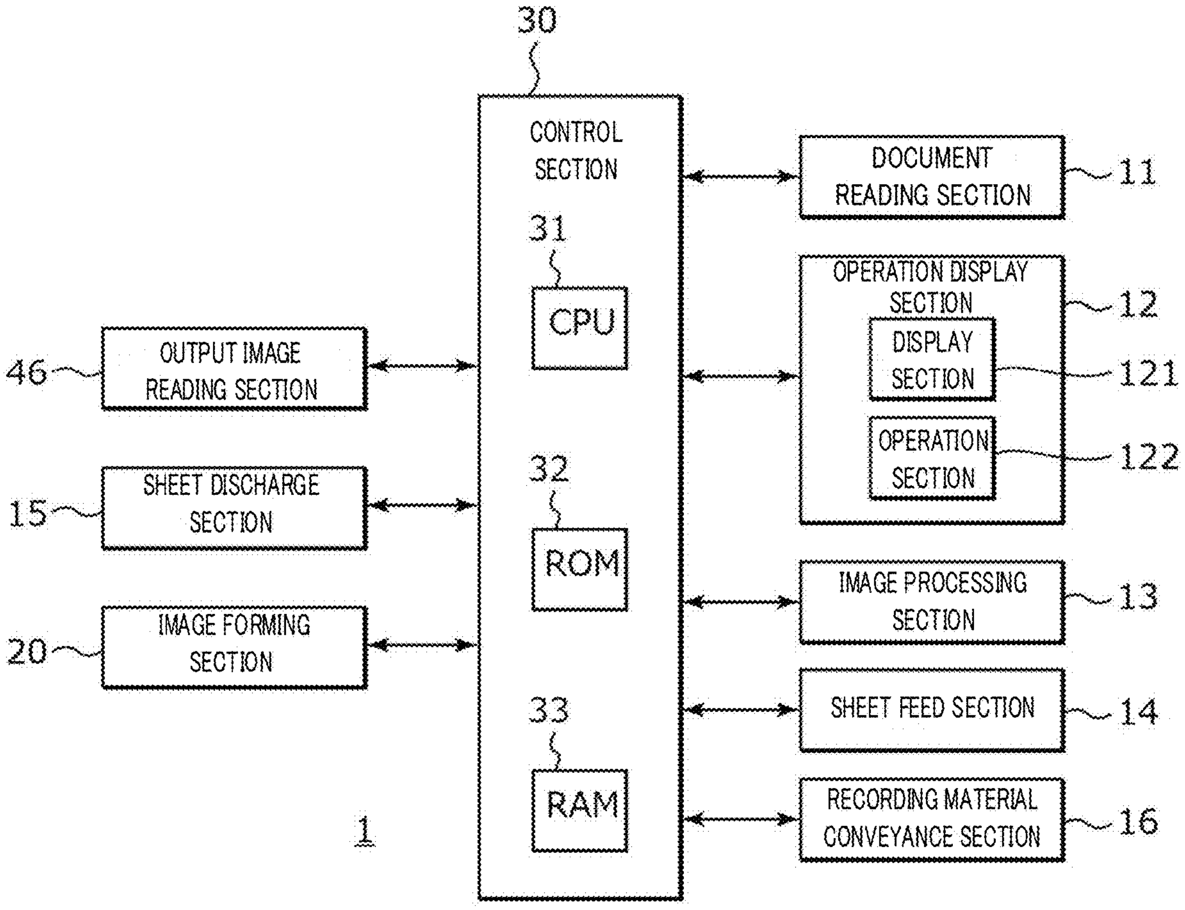
FIG. 3 is a diagram illustrating a main part of a control system of the image forming apparatus.

FIG. 2 is a diagram schematically illustrating an overall configuration of image forming apparatus main body 1A. FIG. 3 is a diagram illustrating a main part of a control system of image forming apparatus 1.

Image forming apparatus main body 1A is a color image forming apparatus of an intermediate transfer method utilizing an electrophotographic process technology. Image forming apparatus main body 1A primarily transfers each color toner image of Y (yellow), M (magenta), C (cyan), and K (black) formed on photosensitive drums 213 to intermediate transfer belt 221. Further, image forming apparatus main body 1A superimposes the toner images of the four colors on intermediate transfer belt 221, and then secondarily transfers the toner images onto a recording material, thereby forming an image.

In the present embodiment, image forming apparatus main body 1A adopts a vertical tandem system. In the vertical tandem system, photosensitive drums 213 corresponding to the four colors of CMYK are arranged in series along a travel direction (vertical direction) of intermediate transfer belt 221, and toner images of the respective colors are sequentially transferred onto intermediate transfer belt 221 by a single procedure.

As illustrated in FIGS. 2 and 3, image forming apparatus main body 1A includes document reading section 11, operation display section 12, image processing section 13, sheet feed section 14, sheet discharge section 15, recording material conveyance section 16, image forming section 20, and control section 30.

Control section 30 performs overall control of image forming apparatus main body 1A by controlling document reading section 11, operation display section 12, image processing section 13, sheet feed section 14, sheet discharge section 15, recording material conveyance section 16, and image forming section 20 according to the respective functions thereof.

Control section 30 includes central processing unit (CPU) 31 as an arithmetic/control apparatus, read only memory (ROM) 32 and random access memory (RAM) 33 as main storage apparatuses, and the like. ROM 32 stores basic programs and basic setting information. Further, a program for realizing image forming processing, such as a sheet discharge program, is stored in ROM 32. CPU 31 reads a program corresponding to the processing content from ROM 32, develops the program in RAM 33, and executes the developed program, thereby controlling the operation of each functional block of image forming apparatus 1.

In the present embodiment, each hardware constituting the functional blocks and control section 30 cooperate with each other to implement the functions of the functional blocks. Note that, the functions of some or all of the functional blocks may be implemented by control section 30 executing a program. Further, some or all of pieces of processing to be executed by control section 30 may be executed by electronic circuits, such as a digital signal processor (DSP), an application specific integrated circuit (ASIC), and a programmable logic device (PLD), which are provided according to the processing.

Document reading section 11 includes automatic document feed apparatus 111 and document image scanning apparatus 112 (scanner). Automatic document feed apparatus 111 is referred to as an auto document feeder (ADF).

Automatic document feed apparatus 111 conveys a document placed on a document tray by a conveyance mechanism and sends the document to document image scanning apparatus 112. Automatic document feed apparatus 111 can continuously read images (including both sides) of a large number of documents placed on a document tray.

Document image scanning apparatus 112 reads a document conveyed from automatic document feed apparatus 111 onto a contact glass or a document placed on the contact glass. Specifically, document image scanning apparatus 112 optically scans a document, and reads a document image by forming, on a light receiving surface of an imaging element (e.g., a charge coupled device (CCD)), an image of reflected light from the document. Document reading section 11 generates input image data based on a reading result of document image scanning apparatus 112. The input image data undergoes predetermined image processing at image processing section 13.

Operation display section 12 is constituted by, for example, a flat panel display with a touch screen. As the flat panel display, a liquid crystal display, an organic EL display, or the like can be used. Operation display section 12 includes display section 121 and operation section 122.

Display section 121 displays various operation screens, an image state, an operation state of each function, and the like according to a display control signal inputted from control section 30.

Operation section 122 includes various operation keys such as a numeric keypad and a start key. Operation section 122 receives various input operations by a user, and outputs an operation signal to control section 30. A user can operate operation display section 12 to make settings related to image formation, such as document setting, image quality setting, magnification setting, application setting, output setting, and recording material setting.

Image processing section 13 includes a circuit or the like that applies digital image processing to input image data according to initial settings or user settings. For example, image processing section 13 performs tone correction on the basis of tone correction data under the control of control section 30. Further, image processing section 13 applies, to the input image data, various kinds of correction processing such as color correction, shading correction, and density correction. Image forming section 20 is controlled based on the image data on which the pieces of processing described above have been performed.

Image forming section 20 includes imaging section 21, intermediate transfer section 22, fixing section 23, and the like. Based on the input image data, imaging section 21 forms a toner image with color toners of a Y component, an M component, a C component, and a K component. Intermediate transfer section 22 transfers the toner image formed by imaging section 21 onto a recording material. Fixing section 23 fixes the transferred toner image to the recording material.

Specifically, imaging section 21 is composed of four imaging sections 21Y, 21M, 21C, and 21K for Y, M, C, and K components, respectively. Imaging sections 21Y, 21M, 21C, and 21K have the same configuration, and therefore, for convenience of illustration and description, common constituent elements are denoted by the same reference signs, and when they are distinguished from each other, they are denoted by adding Y, M, C, and K to their reference signs. Note that, in FIG. 2, reference signs are provided to the constituent elements of imaging section 21Y for the Y component and the reference signs of the constituent elements of other imaging sections 21M, 21C, 21K are omitted.

Imaging section 21 includes exposure apparatus 211, developing apparatus 212, photosensitive drum 213, charging apparatus 214, drum cleaning apparatus 215, and the like. Although not illustrated, imaging section 21 may include a discharging apparatus for removing residual charge remaining on the surface of photosensitive drum 213 after the primary transfer.

Photosensitive drum 213 is, for example, a negatively charged organic photo-conductor (OPC). Photosensitive drum 213 has, for example, a configuration in which an under coat layer (UCL), a charge generation layer (CGL), and a charge transport layer (CTL) are sequentially laminated on the peripheral surface of a conductive cylindrical body formed of aluminum (aluminum tube).

The charge generation layer is formed of an organic semiconductor in which a charge generation material (for example, phthalocyanine pigment) is dispersed in a resin binder (for example, polycarbonate). The charge generation layer generates a pair of positive charge and negative charge upon exposure by exposure apparatus 211. The charge transport layer has a configuration in which a hole conveyance material (electron-donating nitrogen-containing compound) is dispersed in a resin binder (for example, polycarbonate resin). The charge transport layer conveys positive charges generated in the charge generation layer to the surface of the charge transport layer.

Charging apparatus 214 is constituted by, for example, a corona discharge generator such as a scorotron charging apparatus or a corotron charging apparatus. Charging apparatus 214 uniformly and negatively charges the surface of photosensitive drum 213 by corona discharge.

Exposure apparatus 211 is constituted by, for example, an LED print head (LPH). The LPH includes an LED array, an LPH drive section (driver IC), a lens array and the like. In the LED array, a plurality of light emitting diodes (LED) are linearly arranged. The LPH drive section drives each LED. The lens array forms an image on photosensitive drum 213 with light emitted from the LED array. One LED of the LED array corresponds to one dot of an image.

Exposure apparatus 211 emits light corresponding to images of individual color components to photosensitive drum 213. The positive charges generated in the charge generation layer of photosensitive drum 213 by light emission are conveyed to the surface of the charge transport layer, and thus, the surface charges (negative charges) on photosensitive drum 213 are neutralized. Thus, an electrostatic latent image of each color component is formed on the surface of photosensitive drum 213 due to a potential difference from its surroundings.

Developing apparatus 212 accommodates a developer (e.g., two-component-based developer including a toner and a magnetic carrier) of each color component and attaches the toner of each color component to the surface of photosensitive drum 213 to visualize the electrostatic latent image and form a toner image. Specifically, a developing bias voltage is applied to a developer carrier (reference sign is omitted, e.g., a developing roller), and an electric field is formed between photosensitive drum 213 and the developer carrier. Due to a potential difference between photosensitive drum 213 and the developer carrier, the charged toner on the developer carrier moves to and adheres to an exposed section on the surface of photosensitive drum 213. Thus, the electrostatic latent image on photosensitive drum 213 is visualized.

Drum cleaning apparatus 215 removes a transfer residual toner remaining on the surface of photosensitive drum 213 after the primary transfer.

Intermediate transfer section 22 includes intermediate transfer belt 221, primary transfer roller 222, a plurality of support rollers 223 and 224, belt cleaning apparatus 225, secondary transfer roller 226, and the like.

Intermediate transfer belt 221 is an image carrier that carries a toner image, and is a transfer target onto which the toner image on photosensitive drum 213 is transferred. Intermediate transfer belt 221 is composed of a belt having an endless shape and is stretched in a loop shape over the plurality of support rollers 223. At least one of the plurality of support rollers 223 is composed of a driving roller, and the others are composed of driven rollers. The rotation of the driving roller causes intermediate transfer belt 221 to travel at a constant speed.

Primary transfer roller 222 is disposed on the inner peripheral surface side of intermediate transfer belt 221 to face photosensitive drum 213 of each color component. Primary transfer roller 222 is brought into pressure contact with photosensitive drum 213 with intermediate transfer belt 221 therebetween, thereby forming a primary transfer nip for transferring a toner image from photosensitive drum 213 to intermediate transfer belt 221.

Support roller 223 includes opposing roller 224 disposed to face secondary transfer roller 226. Secondary transfer roller 226 is disposed on the outer peripheral surface side of intermediate transfer belt 221, and is brought into pressure contact with opposing roller 224 with intermediate transfer belt 221 therebetween. Thus, a secondary transfer nip for transferring a toner image from intermediate transfer belt 221 to the recording material is formed.

At the primary transfer nip, toner images on photosensitive drum 213 are primarily transferred in a sequentially superposed manner onto intermediate transfer belt 221. Specifically, an electric charge having an opposite polarity of the toner is applied to the inner peripheral surface side of intermediate transfer belt 221 (the side on which the primary transfer roller 222 abuts) by applying a primary transfer voltage to primary transfer roller 222. The toner images are electrostatically transferred onto intermediate transfer belt 221 from photosensitive drum 213.

Thereafter, when the recording material passes through the secondary transfer nip, the toner images on intermediate transfer belt 221 are secondarily transferred onto the recording material. Specifically, an electric charge having an opposite polarity of the toner is applied to a back surface side of the recording material (a side on which secondary transfer roller 226 abuts) by applying a secondary transfer voltage to secondary transfer roller 226. The toner images are electrostatically transferred onto the recording material from intermediate transfer belt 221. The recording material onto which the toner images have been transferred is conveyed toward fixing section 23.

Belt cleaning apparatus 225 includes a belt cleaning blade (reference sign is omitted) that comes into sliding contact with the surface of intermediate transfer belt 221, or the like. Belt cleaning apparatus 225 removes a transfer residual toner remaining on the surface of intermediate transfer belt 221 after the secondary transfer.

Fixing section 23 includes upper fixing section 231, lower fixing section 232, heat source 233, a pressure contact/separation section (illustration is omitted), and the like. Upper fixing section 231 includes a fixing surface-side member disposed on the side of the fixing surface (the surface on which the toner image is formed) of the recording material. Lower fixing section 232 includes a back surface-side support member disposed on the side of the back surface (the surface opposite to the fixing surface) of the recording material. Heat source 233 heats the fixing surface-side member. The pressure contact/separation section brings the back surface-side support member into pressure contact with the fixing surface-side member.

The recording material onto which a toner image has been secondarily transferred and which has been conveyed along a sheet passing path is heated and pressurized when passing through fixing section 23. Thus, the toner image is fixed on the recording material.

Sheet feed section 14 includes sheet feed tray 141 and manual sheet feed section 142. In sheet feed tray 141, flat sheets (standard sheets and special sheets) identified based on the basis weight, the size, and the like are accommodated for each sheet type set in advance. A plurality of sheet feed roller sections (whose reference signs are omitted) are disposed in sheet feed tray 141 and manual sheet feed section 142. An external sheet feed apparatus (illustration is omitted) having a large capacity can be connected to manual sheet feed section 142. The external sheet feed apparatus may be capable of feeding a continuous sheet such as machine-glazed paper, for example. Sheet feed section 14 sends a recording material fed from sheet feed tray 141 or manual sheet feed section 142 to recording material conveyance section 16.

Sheet discharge section 15 includes sheet discharge conveyance roller section 151. Sheet discharge section 15 discharges a recording material sent from recording material conveyance section 16 to the outside of the apparatus.

Recording material conveyance section 16 includes main conveyance section 161, switchback conveyance section 162, back surface printing conveyance section 163, a sheet passing path switching section (illustration is omitted), and the like. Part of recording material conveyance section 16 may be, for example, incorporated into one unit together with fixing section 23, and detachably attached to image forming apparatus 1.

Main conveyance section 161 includes a recording material conveyance element that holds and conveys a recording material. The recording material conveyance element includes, for example, a plurality of conveyance roller sections (reference sign is omitted) including a loop roller section and a registration roller section. Main conveyance section 161 conveys a recording material fed from sheet feed section 14 and passes the recording material through image forming section 20 (intermediate transfer section 22 and fixing section 23). Further, main conveyance section 161 conveys a recording material sent from image forming section 20 (fixing section 23) toward sheet discharge section 15 or switchback conveyance section 162.

Switchback conveyance section 162 temporarily stops a recording material sent from fixing section 23, reverses the conveyance direction, and conveys the recording material to sheet discharge section 15 or back surface printing conveyance section 163.

Back surface printing conveyance section 163 circulates and conveys a recording material switched back by switchback conveyance section 162 to main conveyance section 161. The recording material is passed through main conveyance section 161 in a state in which the back surface is an image formation surface.

The sheet passing path switching section (illustration is omitted) is disposed on the downstream side of fixing section 23 in the recording material conveyance direction. The sheet passing path switching section switches the sheet passing route according to whether a recording material sent out from fixing section 23 is discharged as it is, is reversed and discharged, or is conveyed to back surface printing conveyance section 163. Specifically, control section 30 controls the operation of the sheet passing path switching section (illustration is omitted) based on the processing content (single-sided/double-sided printing, face-up/face-down sheet discharge, or the like) of image formation processing.

A recording material fed from sheet feed section 14 is conveyed to image forming section 20 by main conveyance section 161. Then, when the recording material passes through a secondary transfer section, toner images on intermediate transfer belt 221 are collectively transferred onto a first surface (front surface) of the recording material, and fixing processing is performed at fixing section 23. The recording material on which an image has been formed is discharged to the outside (sheet discharge unit 1B in the present embodiment) by sheet discharge section 15. In a case where images are formed on both sides of a recording material, the recording material on which the image has been formed on the first side is fed to switchback conveyance section 162. Then, the recording material is reversed by returning to main conveyance section 161 by passing through back surface printing conveyance section 163, and an image is formed on a second surface (back surface).

In recording material conveyance section 16, output image reading section 46 is disposed on the downstream of fixing section 23 in the conveyance direction. Output image reading section 46 reads an image formed on a recording material. The reading result of output image reading section 46 is used, for example, to determine the suitability of the quality of the output image formed on the recording material. Note that, output image reading section 46 may be disposed in any position as long as output image reading section 46 can read an output image formed on a recording material, and may be disposed, for example, immediately before sheet discharge conveyance section 43 in sheet discharge unit 1B.

Output image reading section 46 is, for example, a scanner that optically reads an output image formed on a recording material. Specifically, output image reading section 46 is disposed so as to face one side of a conveyed recording material. Output image reading section 46 optically scans a recording material, forms an image of reflected light from the recording material on a light receiving surface of a CCD sensor, reads an output image, and generates read image data under the control of control section 30. Based on the read image data, detection of the colors, position shift, and the like of the output image is performed, and the quality of the output image is automatically inspected. Note that, output image reading section 46 may include a spectrophotometer for measuring the color value based on the reflectance or transmittance of light having each wavelength.

Output image reading section 46 reads an output image for each recording material and outputs a reading result to control section 30. Control section 30 executes discharge processing of the recording material based on the reading result of output image reading section 46. For example, control section 30 causes the sheet discharge position of the first recording material (so-called normal sheet), whose output image is normal, on sheet discharge tray 41 to differ from the sheet discharge position of the second recording material (so-called abnormal sheet), whose output image is abnormal, on sheet discharge tray 41 in the conveyance direction. Thus, it is possible to appropriately distinguish between the first recording material (normal sheet) and the second recording material (abnormal sheet), which are discharged to sheet discharge tray 41.

Figure 4:
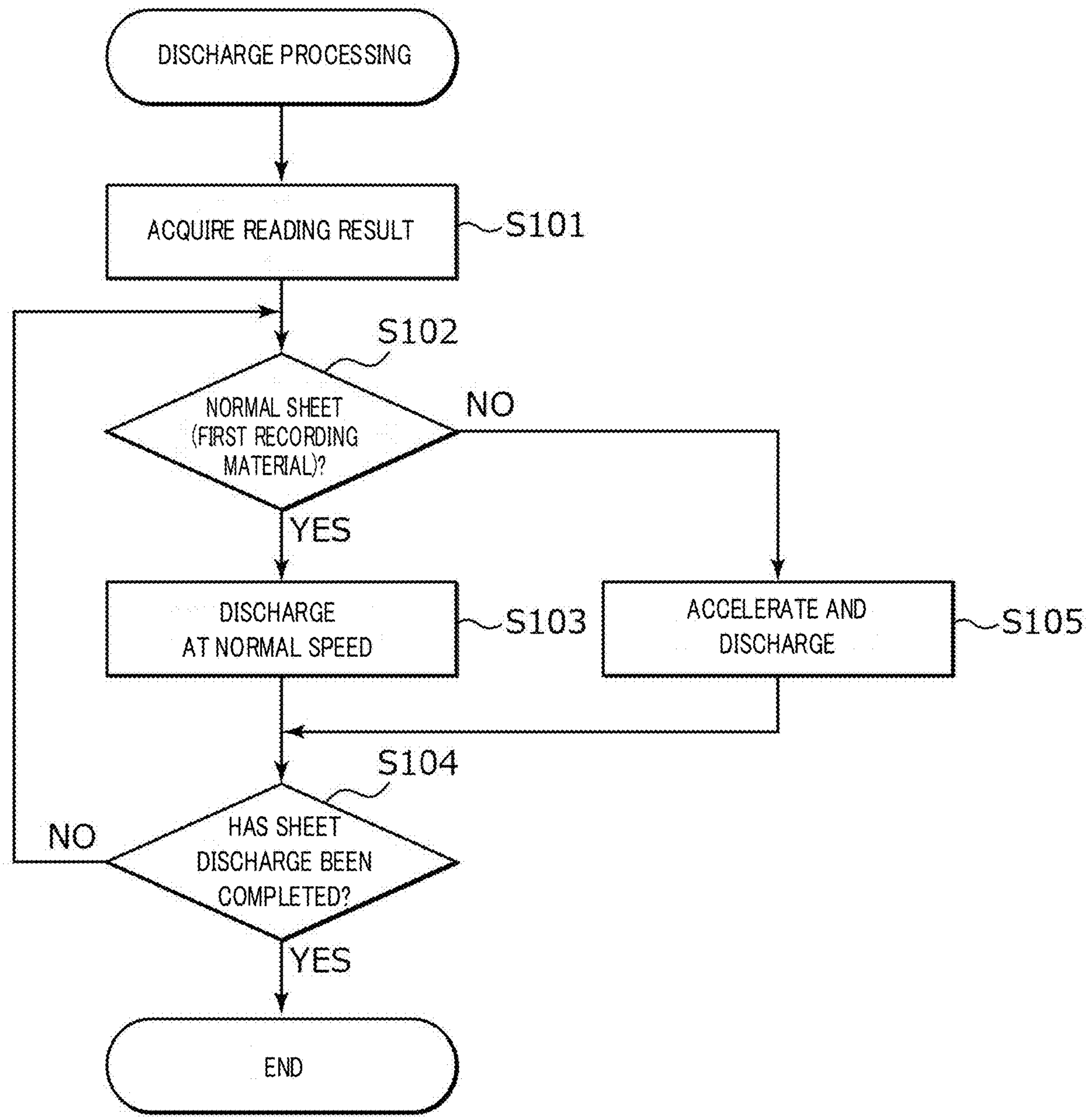
FIG. 4 is a flowchart illustrating an example of sheet discharge processing in the image forming apparatus.

FIG. 4 is a flowchart illustrating an example of sheet discharge processing executed by control section 30. This processing is realized by, for example, CPU 31 executing the sheet discharge program stored in ROM 32 in response to the start of a print job at image forming apparatus 1.

In step S101 of FIG. 4, control section 30 acquires a reading result of output image reading section 46. Control section 30 performs, based on a reading result of output image reading section 46 for each recording material, sheet discharge processing for the recording material.

In step S102, control section 30 determines, based on the acquired reading result, whether the quality of the output image is normal or abnormal. In a case where the quality of the outputted image is normal, that is, in a case where the recording material to be subjected to the sheet discharge processing is the first recording material ("YES" in step S102), control section 30 proceeds to processing in step S103. In a case where the recording material to be subjected to the sheet discharge processing is the second recording material ("NO" in step S102), control section 30 proceeds to step S105.

In step S103, control section 30 controls sheet discharge conveyance section 43 such that the first recording material is discharged to sheet discharge tray 41 at a normal speed. After passing through sheet discharge conveyance section 43, the first recording materials travel by inertia and are sequentially loaded in a predetermined area of sheet discharge tray 41.

In step S104, control section 30 determines whether discharge of every recording material designated by the print job has been completed. In a case where the discharge of every recording material has been completed ("YES" in step S104), the sheet discharge processing ends. In a case where the discharge of every recording material has not been completed ("NO" in step S104), the processing proceeds to step S102.

In step S105, control section 30 controls sheet discharge conveyance section 43 such that the second recording material is accelerated and discharged to sheet discharge tray 41 at a sheet discharge speed faster than the normal speed. After passing through sheet discharge conveyance section 43, the second recording materials travel by inertia. Since the inertia force of the second recording material is greater than the inertia force of the first recording material that is discharged at the normal speed, the second recording materials advance to the downstream side in the conveyance direction more than the first recording material (see FIGS. 5A and 5B).

Figure 5A:
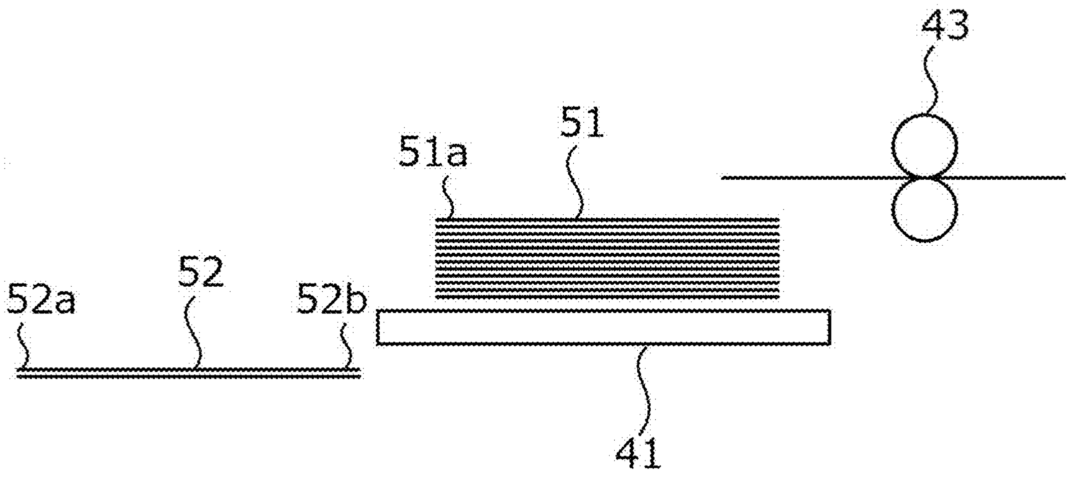
FIGS. 5A and 5B are diagrams illustrating exemplary sheet discharge positions on a sheet discharge tray.

For example, as illustrated in FIG. 5A, second recording material 52 is loaded by completely protruding from the loaded bundle of first recording materials 51. In addition, for example, as illustrated in FIG. 5B, second recording material 52 may be loaded mixedly with first recording materials 51 such that end part 52*a* of second recording material 52 on the downstream side in the conveyance direction protrudes from the loaded bundle of first recording materials 51.

Figure 5B:
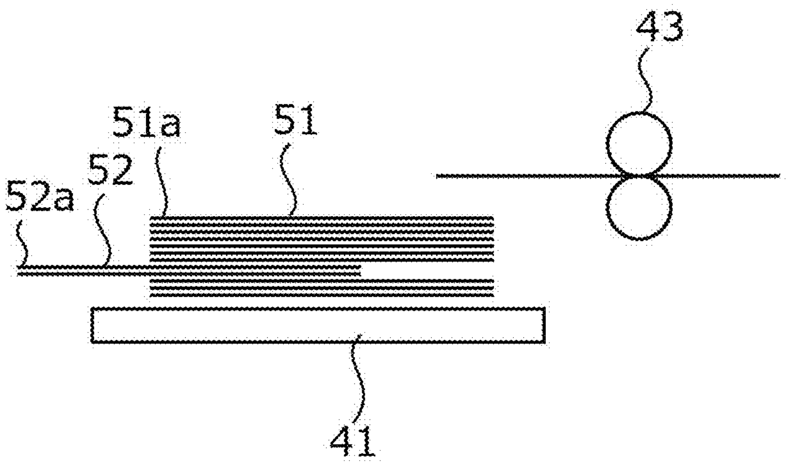

In both the cases of FIGS. 5A and 5B, end part 52*a* of second recording material 52 on the downstream side in the conveyance direction is on the downstream side in the conveyance direction with respect to end part 51*a* of first recording material 51 on the downstream side in the conveyance direction. Furthermore, in the case of FIG. 5A, end part 52*b* of second recording material 52 on the upstream side in the conveyance direction is on the downstream side in the conveyance direction with respect to end part 51*a* of first recording material 51 on the downstream side in the conveyance direction. As described, by causing the sheet discharge position of first recording material 51 on sheet discharge tray 41 to differ from the sheet discharge position of second recording material 52 on sheet discharge tray 41 in the conveyance direction, it is possible to appropriately distinguish between first recording material 51, which is the normal sheet, and second recording material 52, which is the abnormal sheet.

When the processing in step S105 ends, the processing proceeds to step S104.

Figure 6A:
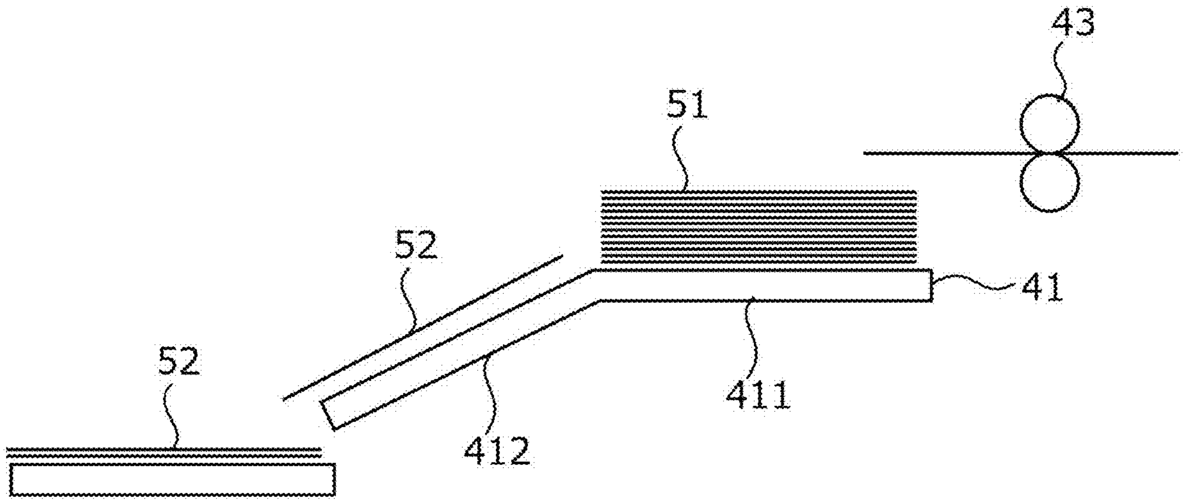
FIGS. 6A and 6B are diagrams illustrating an example of the sheet discharge tray suitable for the sheet discharge processing according to the present embodiment.
Figure 6B:
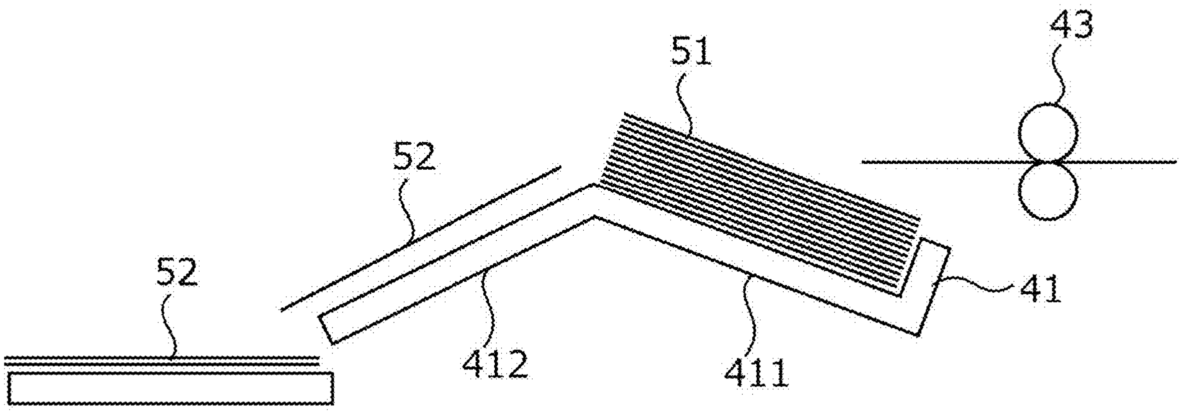

FIGS. 6A and 6B are diagrams illustrating an example of sheet discharge tray 41 suitable for the sheet discharge processing according to the present embodiment.

As illustrated in FIGS. 6A and 6B, sheet discharge tray 41 preferably includes loading section 411 and inclined section 412. Loading section 411 accommodates first recording material 51. Inclined section 412 is provided continuously on the downstream side of loading section 411 in the conveyance direction, and is inclined vertically downward. In sheet discharge tray 41 illustrated in FIGS. 6A and 6B, when second recording material 52 is discharged, second recording material 52 passes through loading section 411 and slides down inclined section 412 by its own weight. Therefore, it is possible to easily separate and discharge second recording material 52 from the loaded bundle of first recording materials 51.

Further, as illustrated in FIG. 6B, in sheet discharge tray 41, the upstream side of loading section 411 in the conveyance direction is preferably inclined vertically downward. In sheet discharge tray 41 illustrated in FIG. 6B, when second recording material 52 passes through on the loaded bundle of first recording materials 51 accommodated in loading section 411, first recording materials 51 are less likely to be dragged by second recording material 52. Therefore, it is possible to easily separate and discharge second recording material 52 without collapsing the loaded bundle of first recording materials 51.

[Variation 1]

Although a case where the second recording material that is the abnormal sheet is accelerated and discharged at a constant sheet discharge speed faster than the normal speed has been described in the above-described embodiment, the sheet discharge speed for the second recording material may be changed according to the sheet discharge easiness of the recording material. The sheet discharge easiness of the recording material can be evaluated by the type of the recording material. The type of the recording material includes, for example, the size (dimensions), the basis weight, or the sheet type of the recording material. For example, it can be said that the recording material is more likely to be discharged as the size and the basis weight are smaller.

Figure 7:
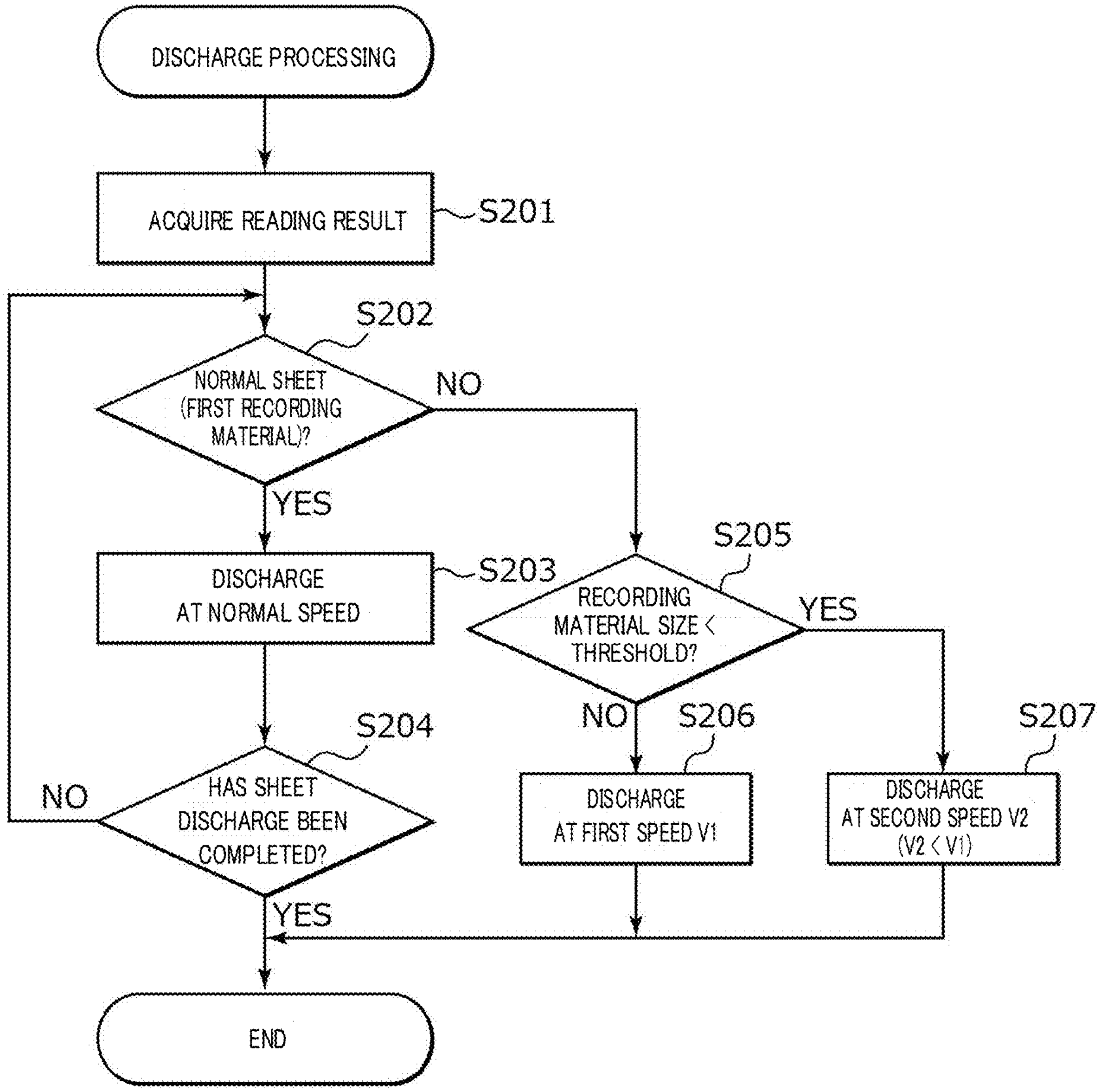
FIG. 7 is a flowchart illustrating another example of the sheet discharge processing in the image forming apparatus.

FIG. 7 is a flowchart illustrating an example of the sheet discharge processing according to Variation 1. Here, as exemplary recording materials different in sheet discharge easiness, a case where recording materials different in size are used will be described.

A description of the same or corresponding pieces of processing as or to those in the flowchart of FIG. 4 will be omitted or simplified. The pieces of processing in steps S201 to S204 of FIG. 7 are the same as those in steps S101 to S104 of FIG. 4.

In the flowchart of FIG. 7, in a case where it has been determined in step S202 that a recording material to be subjected to the sheet discharge processing is the second recording material that is the abnormal sheet ("NO" in step S202), the processing proceeds to step S205.

In step S205, control section 30 determines whether the size of the recording material is smaller than a threshold. In a case where the size of the recording material is equal to or larger than the threshold, that is, in a case where the recording material is relatively hard to be discharged ("NO" in step S205), the processing proceeds to step S206. In a case where the size of the recording material is smaller than the threshold, that is, in a case where the recording material is relatively easy to be discharged ("YES" in step S205), the processing proceeds to step S207. Note that, the threshold used in the determination processing in step S205 is stored in, for example, ROM 32. Further, the size of the recording material to be discharged is set, for example, as print information in a print job.

In step S206, control section 30 controls sheet discharge conveyance section 43 such that the second recording material is accelerated and discharged to sheet discharge tray 41 at first speed V1 faster than the normal speed. First speed V1 is a speed faster than the normal speed and faster than second speed V2 to be described later. The second recording material discharged at first speed V1 is loaded in a state in which the leading end thereof protrudes to the downstream side of the loaded bundle of the first recording materials in the conveyance direction.

In step S207, control section 30 controls sheet discharge conveyance section 43 such that the second recording material is accelerated and discharged to sheet discharge tray 41 at second speed V2 faster than the normal speed. Second speed V2 is a speed faster than the normal speed and slower than first speed V1. The second recording material discharged at second speed V2 is loaded in a state in which the leading end thereof protrudes to the downstream side of the loaded bundle of the first recording materials in the conveyance direction.

As described above, by changing the sheet discharge speed for the second recording material according to the type of the recording material, it is possible to ensure that the sheet discharge positions of the first recording material and the second recording material differ from each other and are distinguished, even in a case where a recording material that is hard to be discharged is used. Note that, the sheet discharge speed for the second recording material may be changed in two stages or in three or more stages according to the type of the recording material.

[Variation 2]

Furthermore, for example, in a case where the sheet discharge path for the recording material can be temporally switched, the first recording material may be discharged to sheet discharge tray 41 and the second recording material may be discharged to sub-sheet discharge tray 42.

Figure 8:
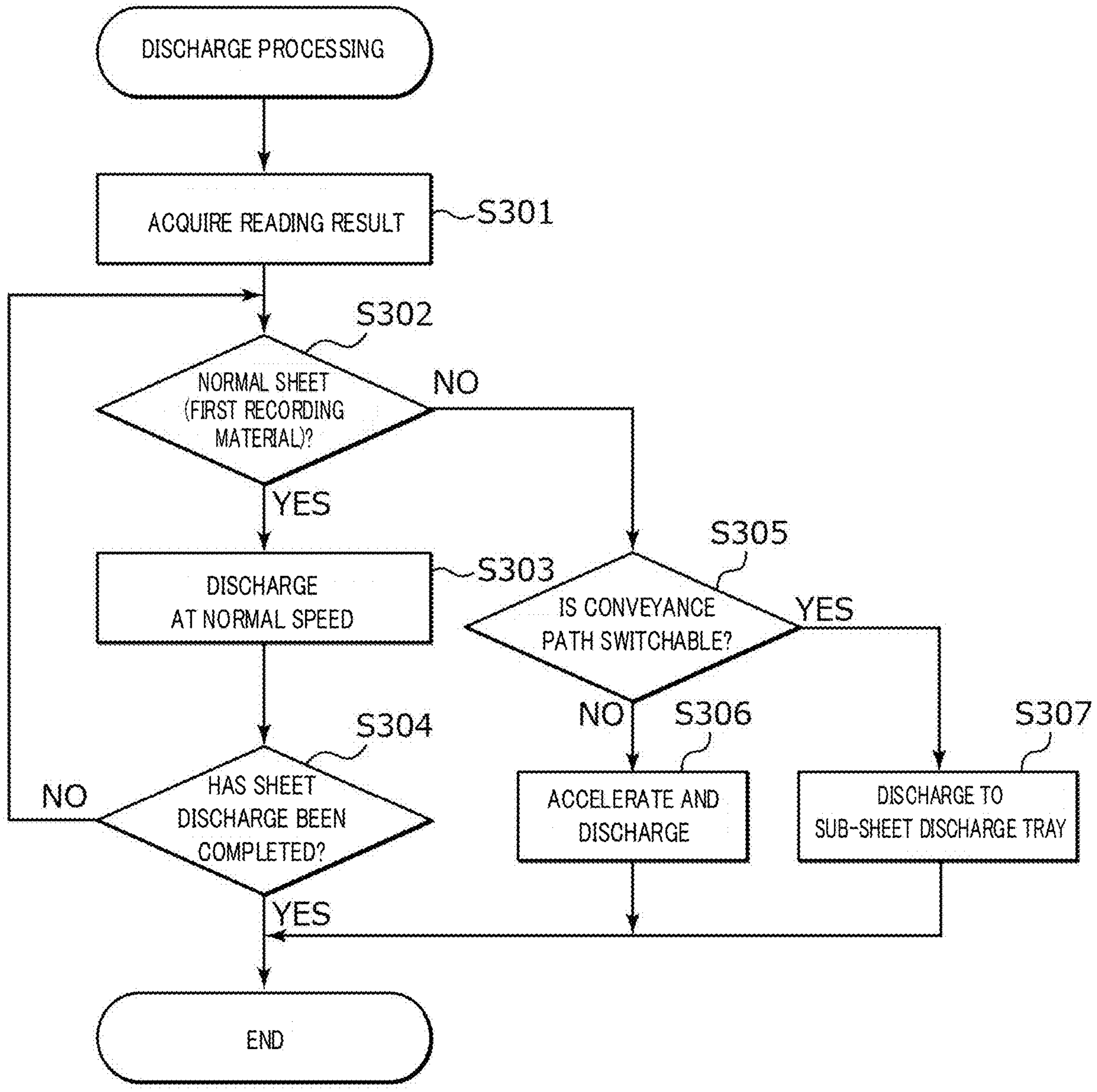
FIG. 8 is a flowchart illustrating yet another example of the sheet discharge processing in the image forming apparatus.

FIG. 8 is a flowchart illustrating an example of the sheet discharge processing according to Variation 2. A description of the same or corresponding pieces of processing as or to those in the flowchart of FIG. 4 will be omitted or simplified. The pieces of processing in steps S301 to S304 of FIG. 8 are the same as those in steps S101 to S104 of FIG. 4.

In the flowchart of FIG. 8, in a case where it has been determined in step S302 that the recording material to be subjected to the sheet discharge processing is the second recording material that is the abnormal sheet ("NO" in step S302), the processing proceeds to step S305.

In step S305, control section 30 determines whether the sheet discharge path is switchable. Whether the sheet discharge path is switchable can be determined based on, for example, the size of the recording material, the conveyance speed, the distance from output image reading section 46 to sheet discharge path switching section 44, the time required for the switching processing of sheet discharge path switching section 44, and the like. In a case where the sheet discharge path is not switchable ("NO" in step S305), the processing proceeds to step S306. In a case where the sheet discharge path is switchable ("YES" in step S305), the processing proceeds to step S307.

In step S306, control section 30 controls sheet discharge conveyance section 43 such that the second recording material is accelerated and discharged to sheet discharge tray 41 at a sheet discharge speed faster than the normal speed. The second recording material is discharged to a position different from that of the first recording material.

In step S307, control section 30 controls sheet discharge path switching section 44 such that the sheet discharge path for the second recording material is switched to branch path 45. The second recording material is discharged to sub-sheet discharge tray 42.

As described above, by switching the sheet discharge path for the second recording material according to the conveyance aspect of the recording material, specifically, whether the sheet discharge path is switchable, it is possible to ensure that the sheet discharge positions of the first recording material and the second recording material differ from each other and are distinguished from each other.

Note that, the sheet discharge processing described in the embodiment (see FIG. 4) and the sheet discharge processing of Variations 1 and 2 (see FIGS. 7 and 8) may be applied in combination.

As described above, image forming apparatus 1 according to the embodiment includes the following features singly or in combination as appropriate.

That is, image forming apparatus 1 includes: image forming section 20 that forms an image on a recording material; sheet discharge conveyance section 43 (conveyance section, conveyor) that conveys the recording material; output image reading section 46 that reads an output image formed on the recording material; sheet discharge tray 41 that accommodates the recording material discharged from sheet discharge conveyance section 43; and control section 30 that controls an operation of sheet discharge conveyance section 43 based on a reading result of output image reading section 46. Control section 30 causes a sheet discharge position of first recording material 51, on which the output image as a normal image is formed, on sheet discharge tray 41 to differ from a sheet discharge position of second recording material 52, on which the output image as an abnormal image is formed, on sheet discharge tray 41 in the conveyance direction.

In addition, the sheet discharge method according to the embodiment is a sheet discharge method of discharging a recording material on which an image is formed, and includes: reading an output image formed on the recording material (step S101 in FIG. 4); determining, when the recording material is discharged, whether the output image is a normal image, based on a reading result of the output image (step S102); and causing a sheet discharge position of first recording material 51, on which the output image as the normal image is formed, on sheet discharge tray 41 to differ from a sheet discharge position of second recording material 52, on which the output image as an abnormal image is formed, on sheet discharge tray 41 in the conveyance direction (steps S103 and S105).

Further, in the embodiment, the image forming apparatus according to the present invention is realized by control section 30 executing a sheet discharge program. That is, the sheet discharge program is a program that causes control section 30 (computer) of image forming apparatus 1 to execute predetermined processing, and the predetermined processing includes: reading an output image formed on a recording material (step S101 in FIG. 4); determining, when the recording material is discharged, whether the output image is a normal image, based on a reading result of the output image (step S102); and causing a sheet discharge position of first recording material 51, on which the output image as the normal image is formed, on sheet discharge tray 41 to differ from a sheet discharge position of second recording material 52, on which the output image as an abnormal image is formed, on sheet discharge tray 41 in the conveyance direction (steps S103 and S105).

The sheet discharge program can be provided, for example, via a computer-readable portable storage medium (including, for example, an optical disc, a magneto-optical disk, and a memory card) in which the program is stored. Furthermore, for example, the sheet discharge program can also be provided by being downloaded from a server, which includes the program, via a network.

According to the present embodiment, since the sheet discharge position of first recording material 51, which is a normal sheet, and the sheet discharge position of second recording material 52, which is an abnormal sheet, differ from each other in the conveyance direction, it is possible to easily distinguish between first recording material 51 and second recording material 52. In addition, since it is only necessary to shift the sheet discharge positions of first recording material 51 and second recording material 52 in the conveyance direction, the sheet discharge mechanism is not complicated and a decrease in productivity is not incurred. Accordingly, image forming apparatus 1 makes it possible to appropriately distinguish between and discharge recording materials based on the suitability of the image quality.

In image forming apparatus 1, control section 30 controls sheet discharge conveyance section 43 (conveyance section, conveyor) such that end part 52*a* of second recording material 52 on the downstream side in the conveyance direction is on the downstream side in the conveyance direction with respect to end part 51*a* of first recording material 51 on the downstream side in the conveyance direction. Thus, the leading edge of second recording material 52, which is an abnormal sheet, protrudes from a loaded bundle of first recording materials 51, which are normal sheets, and thus, first recording material 51 and second recording material 52 can be easily distinguished from each other.

In image forming apparatus 1, control section 30 controls sheet discharge conveyance section 43 (conveyance section, conveyor) such that end part 52*b* of second recording material 52 on the upstream side in the conveyance direction is on the downstream side in the conveyance direction with respect to end part 51*a* of first recording material 51 on the downstream side in the conveyance direction. Thus, second recording material 52 in its entirety, which is an abnormal sheet, gets out from a loaded bundle of first recording materials 51, which are normal sheets, and thus, first recording materials 51 and second recording materials 52 can be easily distinguished from each other.

In image forming apparatus 1, control section 30 causes first recording material 51 to be discharged at a normal speed and causes second recording material 52 to be discharged at a sheet discharge speed faster than the normal speed. Thus, the sheet discharge positions of first recording material 51 and second recording material 52 in the conveyance direction can be easily caused to differ from each other without providing a complicated sheet discharge mechanism.

In image forming apparatus 1, control section 30 changes the sheet discharge speed for second recording material 52 according to sheet discharge easiness of the recording material. Specifically, control section 30 changes the sheet discharge speed for second recording material 52 according to a size, a basis weight, or a sheet type of the recording material. Thus, even in a case where a recording material that is hard to be discharged is used, it is possible to ensure that the sheet discharge positions of first recording material 51 and second recording material 52 differ from each other and are distinguished from each other.

Image forming apparatus 1 further includes sub-sheet discharge tray 42 different from sheet discharge tray 41. Sheet discharge path switching section 44 (conveyance section, conveyor) is configured to be capable of switching a sheet discharge path for the recording material to sheet discharge tray 41 or sub-sheet discharge tray 42. Control section 30 causes second recording material 52 to be discharged to sub-sheet discharge tray 42 in a case where the sheet discharge path for second recording material 52 is switchable to sub-sheet discharge tray 42. Thus, by switching the sheet discharge path for second recording material 52, it is possible to ensure that the sheet discharge positions of first recording material 51 and second recording material 52 differ from each other and are distinguished from each other.

In image forming apparatus 1, sheet discharge tray 41 includes loading section 411, which accommodates first recording material 51, and inclined section 412, which is provided continuously on the downstream side of loading section 411 in the conveyance direction and is inclined vertically downward. Furthermore, the upstream side of loading section 411 in the conveyance direction is inclined vertically downward. Thus, second recording material 52 can be easily separated from a loaded bundle of first recording materials 51 and discharged.

Although the invention made by the present inventor has been specifically described above based on an embodiment, the present invention is not limited to the above-described embodiment, and modifications can be made without departing from the spirit and scope of the present invention.

For example, although the present invention is applied to a color image forming apparatus of an electrophotographic method, the present invention can also be applied to a color image forming apparatus of an inkjet method. Further, the present invention can also be applied to a monochrome image forming apparatus.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus, comprising:

an image former that forms an image on a recording material;

a conveyor that conveys the recording material;

an output image reader that reads an output image formed on the recording material;

a sheet discharge tray that accommodates the recording material discharged from the conveyor; and a hardware processor that controls an operation of the conveyor based on a reading result of the output image reader, wherein the hardware processor causes a sheet discharge position of a first recording material on the sheet discharge tray to differ from a sheet discharge position of a second recording material on the sheet discharge tray in a conveyance direction by varying a sheet discharge speed, the first recording material being a recording material on which the output image as a normal image is formed, the second recording material being a recording material on which the output image as an abnormal image is formed.

2. The image forming apparatus according to claim 1, wherein the hardware processor controls the conveyor such that an end part of the second recording material on a downstream side in the conveyance direction is on the downstream side in the conveyance direction with respect to an end part of the first recording material on the downstream side in the conveyance direction.

3. The image forming apparatus according to claim 2, wherein the hardware processor controls the conveyor such that an end part of the second recording material on an upstream side in the conveyance direction is on the downstream side in the conveyance direction with respect to an end part of the first recording material on the downstream side in the conveyance direction.

4. The image forming apparatus according to claim 1, wherein the hardware processor causes the first recording material to be discharged at a normal speed and causes the second recording material to be discharged at a sheet discharge speed faster than the normal speed.

5. The image forming apparatus according to claim 4, wherein the hardware processor changes the sheet discharge speed for the second recording material according to sheet discharge easiness of the recording material.

6. The image forming apparatus according to claim 5, wherein the hardware processor changes the sheet discharge speed for the second recording material according to a size, a basis weight, or a sheet type of the recording material.

7. The image forming apparatus according to claim 1, further comprising a sub-sheet discharge tray different from the sheet discharge tray, wherein:

the conveyor is configured to be capable of switching a sheet discharge path for the recording material to the sheet discharge tray or the sub-sheet discharge tray, and the hardware processor causes the second recording material to be discharged to the sub-sheet discharge tray in a case where the sheet discharge path for the second recording material is switchable to the sub-sheet discharge tray.

8. The image forming apparatus according to claim 1, wherein the sheet discharge tray includes a loader and an inclination, the loader accommodating the first recording material, the inclination being provided continuously on a downstream side of the loader in the conveyance direction and being inclined vertically downward.

9. The image forming apparatus according to claim 8, wherein an upstream side of the loader in the conveyance direction is inclined vertically downward.

10. A sheet discharge method of discharging a recording material on which an image is formed, the sheet discharge method comprising:

reading an output image formed on the recording material;

determining, when the recording material is discharged, whether the output image is a normal image, based on a reading result of the output image; and causing a sheet discharge position of a first recording material on a sheet discharge tray to differ from a sheet discharge position of a second recording material on the sheet discharge tray in a conveyance direction by varying a sheet discharge speed, the first recording material being a recording material on which the output image as the normal image is formed, the second recording material being a recording material on which the output image as an abnormal image is formed.

11. A non-transitory computer-readable recording medium storing a program that causes a computer to execute predetermined processing, wherein the predetermined processing includes:

reading an output image formed on a recording material;

determining, when the recording material is discharged, whether the output image is a normal image, based on a reading result of the output image; and causing a sheet discharge position of a first recording material on a sheet discharge tray to differ from a sheet discharge position of a second recording material on the sheet discharge tray in a conveyance direction by varying a sheet discharge speed, the first recording material being a recording material on which the output image as the normal image is formed, the second recording material being a recording material on which the output image as an abnormal image is formed.

12. The image forming apparatus according to claim 8, wherein the inclination is inclined relative to the loader and accommodates the second recording material.

13. The image forming apparatus according to claim 12, wherein the inclination is inclined vertically downward with respect to the conveyance direction, and the loader is inclined vertically upward with respect to the conveyance direction.

* * * * *